(12) United States Patent
Beha

(10) Patent No.: US 6,468,656 B1
(45) Date of Patent: Oct. 22, 2002

(54) EXTRUSION PROFILE FOR TRANSPORT AND DRIVE BELTS

(75) Inventor: Bernhard Beha, Glottertal (DE)

(73) Assignee: Beha GmbH Technische Neuentwicklungen, Glottertal (DE)

( * ) Notice: Subject to any disclaimer, the term of this patent is extended or adjusted under 35 U.S.C. 154(b) by 0 days.

(21) Appl. No.: 09/449,513

(22) Filed: Nov. 29, 1999

(30) Foreign Application Priority Data

Dec. 2, 1998 (DE) .......................................... 198 55 548
Jan. 9, 1999 (DE) .......................................... 199 00 551

(51) Int. Cl.$^7$ ............................. A23B 55/00; B32B 7/00
(52) U.S. Cl. ........................ 428/396; 428/357; 428/361; 428/364; 428/367; 264/172.19; 264/172.11
(58) Field of Search ................................. 156/154, 172, 156/178, 187, 278; 28/112, 103; 428/295.1, 192, 297.4, 396, 357, 361, 364, 367; 264/172.19, 172.11

(56) References Cited

U.S. PATENT DOCUMENTS 4,937,925 A * 7/1990 Mcgee ........................ 428/392

* cited by examiner

Primary Examiner—Rich Weisberger
(74) Attorney, Agent, or Firm—Nath & Associates PLLC; Gary M. Nath; Marvin C. Berkowitz

(57) ABSTRACT

Specified is an extrusion profile of a thermoplastic material for transport or drive belts. The extrusion profile is reinforced in that a content of approximately 0.5 to 40 percent by weight of glass fibers, aramide fibers, or carbon fibers are mixed with the plastic. The extrusion profile can be welded into infinite belts with or without plastic casing.

18 Claims, No Drawings

EXTRUSION PROFILE FOR TRANSPORT AND DRIVE BELTS

FIELD OF THE INVENTION

Extrusion Profile for Transport and Drive Belts

The invention relates to an extrusion profile of a thermoplastic material for transport and drive belts according to the preamble of claim 1, and to a method for producing said extrusion profile.

DESCRIPTION OF THE PRIOR ART

A large number of extruded belts made from a thermoplastic material, especially on a polyurethane and polyester basis, are used in drive and transport technology. For their production, a profile (profile material) is extruded as yard ware and is, in most cases, welded in a suitable length to form an infinite belt. Depending on the intended purpose, the belts are constructed as round belts, V-belts, flat belts or with another profile cross-section.

A known way of increasing the tensile strength and tear resistance of such belts is by embedding a core as a tension-bearing element into the extrusion profile made from the thermoplastic material during the extrusion process. This tension-bearing element consists of a strand of reinforcement fibers, for example, aramide fibers, glass fibers or carbon fibers, or a nylon or wire rope.

With these known tension-reinforced belts, problems occur when the extrusion profile is welded into infinite belts. The tension-bearing core impedes the thermoplastic welding of the plastic. The tension-bearing core is therefore commonly removed before the welding from the ends of the extrusion profile that will be welded to each other, so that only the thermoplastic material abuts at the welding point and is welded. The removal of the tension-bearing core is a time-consuming work step. But the removal of the tension-bearing core at the welding point particularly results in an unreinforced weak point of the belt that has a lower tearing and strain resistance. The known belts therefore have a tendency to tear at the welding seam.

SUMMARY OF THE INVENTION

The invention has the object of making available an extrusion profile for transport and drive belts with high tensile strength and tear resistance that can be welded into infinite belts without being weakened.

This object is realized according to the invention by an extrusion profile of thermoplastic material for transport and drive belts characterized in that reinforcement fibers with a content of approximately 0.5 to 40 percent by weight are mixed with the plastic of the extrusion profile.

A method for producing the extrusion profile is characterized in that during the extrusion of the extrusion profile, reinforcement fibers with a content of approximately 0.5 to 40 percent by weight are mixed with the plastic.

DETAILED DESCRIPTION OF THE INVENTION

Advantageous embodiments of the invention are characterized in the secondary claims. According to the invention, a profile (profile material) for the transport or drive belt is extruded from a thermoplastic material. Preferably, a thermoplastic elastomer on a polyurethane or polyester basis is used. The extrusion is performed using an extrusion system known per se, for example, a screw extruder.

A portion of approximately 0.5 to 40 percent by weight of reinforcement fiber is mixed into the thermoplastic material. In particular, glass fibers were used successfully as reinforcement fibers. Other reinforcement fibers, such as aramide fibers (Kevlar) or carbon fibers also can be used.

Depending on the type of thermoplastic material and reinforcement fibers, especially good characteristics are obtained with a fiber content of 5 to 30 percent by weight, and in particular 8 to 20 percent by weight of the plastic. The percentages hereby are in each case related to the total amount of plastic and reinforcement fiber.

The reinforcement fibers are mixed into the plastic so as to be distributed as homogeneously as possible. It is particularly advantageous for such a homogeneous admixture of the reinforcement fibers into the plastic that the reinforcement fibers are mixed into the plastic in the form of staple fibers (short fibers). In particular, such staple fibers already can be added to the extrusion system mixed homogeneously with the powdered or granulated plastic mass.

The extrusion profile according to the invention can be used directly as a transport or drive belt and be welded into infinite belts. The extrusion profile hereby forms the entire profile cross-section of the belt. The entire belt cross-section is reinforced with the reinforcement fibers.

The extrusion profile according to the invention also can be used as a tension-bearing core. In this case, the extrusion profile reinforced with the reinforcement fibers is encased with a thermoplastic material without reinforcement fibers. For this purpose, the extrusion profile according to the invention is forwarded into another extrusion system and is encased in the co-extrusion process with the thermoplastic material. A particularly good connection between the extrusion profile of the tension-bearing core and the casing is obtained if the same thermoplastic material is used for the extrusion profile and the casing.

The shape of the cross-section of the extrusion profile is freely selectable and derives from the intended purpose. It is possible to produce round profiles, V-profiles, flat profiles, and any other shape of profile. If the extrusion profile according to the invention is used as a tension-bearing core, the profile of the casing also can be selected in a shape corresponding to the respective application.

The percentage of reinforcement fibers also depends in part on whether the fiber-reinforced extrusion profile forms the entire profile cross-section of the belt or is used as a plastic-encased tension-bearing core. In particular, glass fibers as admixed reinforcement fibers result in a greater wear of the extrusion nozzle. The extrusion nozzles for more complicated belt profiles are relatively expensive. If the entire profile-cross-section is reinforced with glass fiber, attempts are therefore made to keep the reinforcement fiber content as small as possible, whereby said reinforcement fiber content must, however, be high enough to achieve the desired improvement in tensile strength and tear resistance. In these application cases, the content of reinforcement fibers is preferably selected at approximately 0.5 to 15 percent by weight, whereby a clear improvement in tensile strength and tear resistance is achieved in general with a content of approximately 5 to 10 percent, while the wear of the extrusion nozzles is not yet too high. If the fiber-reinforced extrusion is used as tension-bearing core, however, which is then encased with plastic, a simple cross-section profile, for example a circular cross-section profile, then can be used for the tension-bearing core. The more complicated profile shape of the belt is obtained with the plastic casing. Since extrusion nozzles with a simple cross-section, for example, a circular cross-section, can be produced at lower cost, a higher wear due to the reinforcement fibers can be justified in these cases. Therefore higher reinforcement fiber contents, of approximately 5 to 20 percent by weight, preferably 10 to 15 percent by weight, can be used.

The extrusion profile according to the invention can be thermoplastically welded without preparation or finishing. Hereby welding methods known per se can be used, such as butt-welding with heat-reflectors, contact-less welding, friction welding, infrared welding, ultrasound welding, and hot-air welding.

The extrusion profile has the same high tensile strength and tear resistance at the welding seam as in the other areas that have not been welded. If the extrusion profile according to the invention forms the entire profile cross-section of the belt, this results in a weldability not affected by the reinforcement fibers. If a belt is produced by encasing the extrusion profile according to the invention, this belt can be welded over its entire profile cross-section without requiring a special processing of the tension-bearing core formed by the extrusion profile. The welding takes place in the same manner and homogeneously over the cross-section of the extrusion profile and the casing.

Tensile tests with the extrusion profile according to the invention showed a perfect connection in the area of the welding seam. The extrusion profiles with the welding seam were tested, for example, in the following tensile tests:

1. A round profile according to the invention with a diameter of 3 mm, made from polyurethane and having a glass fiber content of 10% only broke at an applied force of 250 N and an extension of 65%.
2. This extrusion profile was additionally encased in the co-extrusion process with polyurethane (PU80A), resulting in a round belt with a diameter of 9 mm. The round belt could be stressed up to 500 N, with an expansion of 400%, without a breaking of the belt occurring. The belt only broke at an extension of 700%. But this break occurred neither at the tension-bearing core of the extrusion profile according to the invention, nor in the casing near the welding seam.

What is claimed is:

1. An extrusion profile of thermoplastic material for transport and drive belts, comprising:
   an extrusion having a cross-section profile, said extrusion comprised of a homogeneous mixture of an extrudable plastic and reinforcement fibers mixed with the plastic, said fibers comprising approximately 0.5 to 40 percent by weight of the mixture.
2. The extrusion profile as claimed in claim 1, wherein said reinforcement fibers comprise 5 to 30 percent by weight of the mixture.
3. The extrusion profile as claimed in claim 1, wherein the thermoplastic material is an elastomer.
4. The extrusion profile as claimed in claim 1, wherein the reinforcement fibers are glass fibers.
5. The extrusion profile as claimed in claim 1, wherein the reinforcement fibers are aramide fibers or carbon fibers.
6. The extrusion profile as claimed in claim 1, wherein the reinforcement fibers are staple fibers.
7. The extrusion profile as claimed in claim 1, wherein the extrusion profile forms an entire cross-section profile of the belt.
8. The extrusion profile as claimed in claim 1, wherein the extrusion profile is encased with a further thermoplastic plastic material.
9. The extrusion profile as claimed in claim 8, wherein the plastic of the extrusion and the further thermoplastic plastic material that encases the extrusion are identical.
10. A method for producing an extrusion profile of thermoplastic material for transport or drive belts comprised of a mixture of an extrudable plastic and reinforcement fibers, comprising the steps of:
    providing a powdered or granulated plastic;
    providing staple fibers as the reinforcement fibers;
    mixing the plastic with the reinforcement fibers to produce a homogeneous mixture wherein the reinforcement fibers comprise approximately 0.5 to 40 percent by weight;
    extruding the mixture through a die adapted to produce an extrusion having a cross-section profile.
11. The method as claimed in claim 10, further comprising the step of encasing the extrusion profile with a further thermoplastic material in a co-extrusion process.
12. The extrusion profile as claimed in claim 1 wherein said extrudable plastic is granulated or powdered.
13. The extrusion profile as claimed in claim 1 wherein the mixture is extruded to form the extrusion.
14. The extrusion profile as claimed in claim 2, wherein said reinforcement fibers comprise 8 to 20 percent by weight of the mixture.
15. The extrusion profile as claimed in claim 3 wherein said elastomer is a polyurethane.
16. The extrusion profile as claimed in claim 3 wherein said elastomer is a polyester.
17. The method as claimed in claim 10, wherein the reinforcement fibers comprise approximately 5 to 30 percent by weight.
18. The method as claimed in claim 17, wherein the reinforcement fibers comprise approximately 8 to 20 percent by weight.

* * * * *